（12） United States Patent
Wietfeld

(10) Patent No.: US 9,292,924 B2
(45) Date of Patent: Mar. 22, 2016

(54) METHOD AND DEVICE FOR MONITORING A SPATIAL REGION

(75) Inventor: Martin Wietfeld, Bad Ditzenbach (DE)

(73) Assignee: PILZ GMBH & CO. KG, Ostfildern (DE)

( * ) Notice: Subject to any disclaimer, the term of this patent is extended or adjusted under 35 U.S.C. 154(b) by 662 days.

(21) Appl. No.: 13/354,405

(22) Filed: Jan. 20, 2012

(65) Prior Publication Data

US 2012/0182419 A1    Jul. 19, 2012

Related U.S. Application Data

(63) Continuation of application No. PCT/EP2010/060686, filed on Jul. 23, 2010.

(30) Foreign Application Priority Data

Jul. 24, 2009  (DE) .................... 10 2009 035 755

(51) Int. Cl.
  *B25J 9/16*    (2006.01)
  *G06T 7/00*    (2006.01)
  *F16P 3/14*    (2006.01)

(52) U.S. Cl.
  CPC .............. *G06T 7/0042* (2013.01); *B25J 9/1676* (2013.01); *F16P 3/14* (2013.01); *F16P 3/142* (2013.01); *G06T 7/0085* (2013.01); *G06T 2207/10021* (2013.01); *G06T 2207/30196* (2013.01)

(58) Field of Classification Search
  CPC ........ B25J 9/1676; F16P 3/14; G06T 7/0042; G06T 7/0085
  USPC ................................. 348/137, 141; 382/106
  See application file for complete search history.

(56) References Cited

U.S. PATENT DOCUMENTS 6,538,732 B1 * 3/2003 Drost et al. ................ 356/241.1
6,950,550 B1 * 9/2005 Sumi et al. ..................... 382/154
(Continued)

FOREIGN PATENT DOCUMENTS

DE    195 36 297 A1    4/1997
DE    100 26 710    *    5/2000   ........... G08B 13/196
(Continued)

OTHER PUBLICATIONS

ISA/EP; English language translation of International Preliminary Report on Patentability (Chapter 1); issued by WIPO Feb. 7, 2012; 12 pages.

*Primary Examiner* — Jay Patel
*Assistant Examiner* — Reza Aghevli
(74) *Attorney, Agent, or Firm* — Harness, Dickey & Pierce, P.L.C.

(57) ABSTRACT

A first and a second image recording unit, which are arranged at a defined distance from one another, are provided for monitoring a spatial region. The spatial region has at least one structure having a plurality of substantially parallel edges. A number of reference marks are arranged at the structure. A first image of the spatial region is recorded by means of the first image recording unit. A second image is recorded by means of the second image recording unit. A number of reference distances between the image recording units and the reference marks are determined. A structure position of the structure is determined on the basis of the reference distances. Moreover, a number of object positions are determined on the basis of the first and second images, wherein each object position represents the spatial distance of an object relative to the image recording units. Depending on the object positions, a switching signal is generated.

18 Claims, 5 Drawing Sheets

(56) References Cited

U.S. PATENT DOCUMENTS

| | | | |
|---|---|---|---|
| 7,564,990 B2* | 7/2009 | Kern et al. | 382/100 |
| 7,729,511 B2* | 6/2010 | Wohler et al. | 382/103 |
| 2004/0234123 A1* | 11/2004 | Shirai et al. | 382/154 |
| 2005/0207618 A1 | 9/2005 | Wohler et al. | |
| 2007/0211143 A1* | 9/2007 | Brodie et al. | 348/141 |
| 2008/0069406 A1* | 3/2008 | Matsuo et al. | 382/106 |
| 2008/0123903 A1* | 5/2008 | Matsuo et al. | 382/106 |
| 2008/0170755 A1* | 7/2008 | Nasser et al. | 382/106 |
| 2009/0015663 A1 | 1/2009 | Doettling et al. | |
| 2009/0046895 A1* | 2/2009 | Pettersson et al. | 382/106 |
| 2009/0096884 A1* | 4/2009 | Schultz et al. | 348/222.1 |
| 2009/0268029 A1* | 10/2009 | Haussmann et al. | 348/153 |
| 2011/0054665 A1* | 3/2011 | Wingbermuehle et al. | 700/174 |

FOREIGN PATENT DOCUMENTS

| | | | | |
|---|---|---|---|---|
| DE | 10 2006 023 787 | * | 5/2006 | F16P 3/14 |
| DE | 10 2005 063 217 A1 | | 7/2007 | |
| EP | 1 543 270 B1 | | 6/2005 | |
| EP | 1 647 357 | * | 4/2006 | B23Q 11/00 |
| JP | 2000-115810 | | 4/2000 | |
| JP | 2001-351200 | | 12/2001 | |
| JP | 2004-184240 | | 7/2004 | |
| JP | 2005-250994 | | 9/2005 | |
| JP | 2007-212187 | | 8/2007 | |
| WO | WO 2007/085330 | * | 12/2006 | G05B 19/4061 |
| WO | 2007/085330 A1 | | 8/2007 | |
| WO | 2008/061607 A1 | | 5/2008 | |
| WO | 2008/098831 A1 | | 8/2008 | |

* cited by examiner

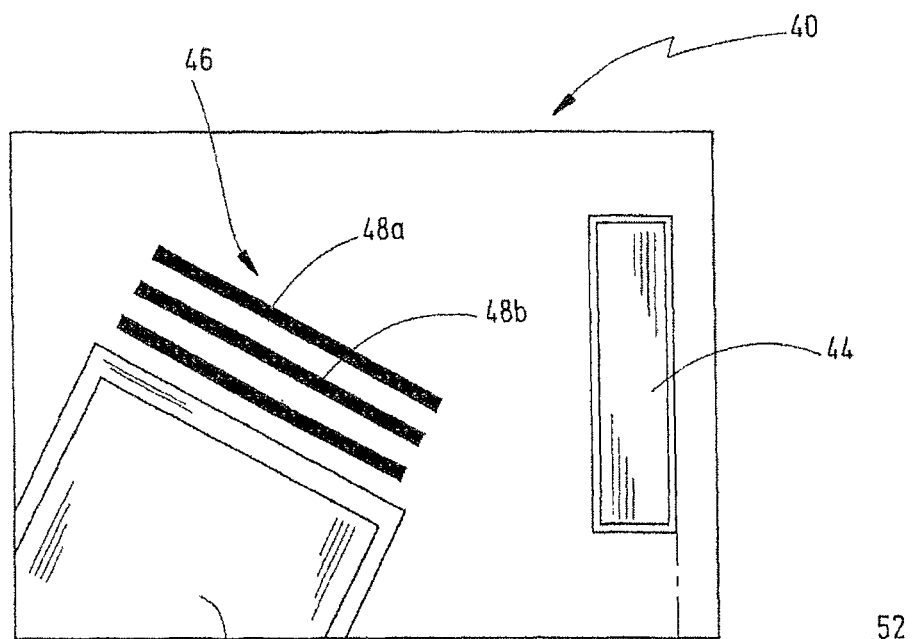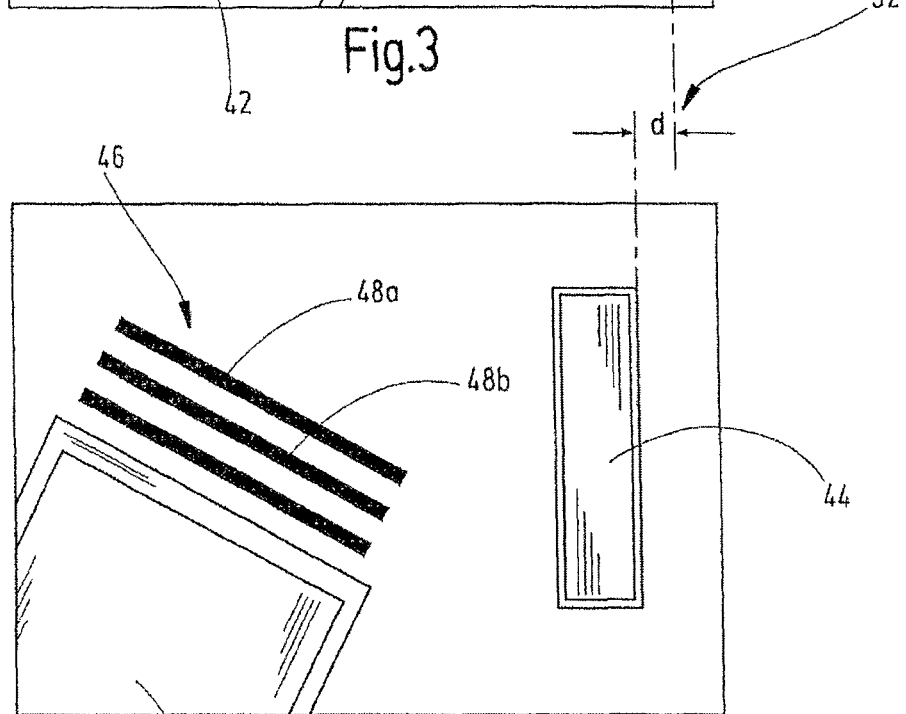

METHOD AND DEVICE FOR MONITORING A SPATIAL REGION

CROSS REFERENCES TO RELATED APPLICATIONS

This application is a continuation of international patent application PCT/EP2010/060686 filed on Jul. 23, 2010 designating the U.S., which international patent application has been published in German language and claims priority from German patent application DE 10 2009 035 755.6 filed on Jul. 24, 2009. The entire contents of these priority applications are incorporated herein by reference.

BACKGROUND OF THE INVENTION

The present invention relates to a method and a device for monitoring a spatial region, especially in the context of safeguarding a hazardous machine.

EP 1 543 270 B1 discloses a method and a device which serve for safeguarding the hazardous region of a machine operating in automated fashion. The device has at least two image recording units arranged at a defined distance from one another. Each image recording unit provides an image of the spatial region in which the machine is arranged. The images of the two image recording units are evaluated by means of at least two different scene analysis methods, in order to obtain a three-dimensional image of the monitored spatial region. In other words, positions of individual objects in the spatial region are determined on the basis of the images recorded in parallel, wherein said positions also include distance information. Afterward, on the basis of defined protection regions or protection spaces, it is possible to decide whether an object, such as a person, for instance, has approached the machine operating in automated fashion to an extent such that a hazard exists. If appropriate, the machine is switched off or operated at reduced speed.

With such a device, the scene analysis methods and, in particular, the determination of object distances are typically based on objects and/or structures in each of the two recorded images, which objects have to be identified and assigned to one another. Since the two image recording units are arranged at a distance from one another, each image recording unit has a different viewing angle. Therefore, identical objects and/or structures appear with respect to one another in the two images, wherein the relative offset of an object in the two images is dependent on the defined distance between the image recording units and on the distance of the object with respect to the image recording units. Consequently, given a known distance between the image recording units, it is possible to determine the distance to the object on the basis of the images. The functional principle corresponds in a certain way to human three-dimensional vision.

The Assignee's practical experience with a device of this type has shown that a reliable and accurate distance measurement using this principle is very complex and difficult if structures having a plurality of relatively closely spaced substantially parallel edges are present within the monitored spatial region. Such edges can be three-dimensional structures such as, for instance, a staircase, a lattice fence or vertical blinds, or they can be two-dimensional structures such as, for instance, a striped pattern on the floor or on a wall. The parallel edges make it more difficult to unambiguously assign an edge in the two recorded images. An incorrect assignment, where different edges are assigned to one another, generally leads to an incorrect distance measurement. This is particularly problematic if the device and the method are used for safeguarding a hazardous region, such as, for instance, the hazardous region of a machine operating in automated fashion.

DE 10 2005 063 217 A1 describes a method for configuring a prior art device for monitoring a spatial region. The configuration includes the definition of protection spaces and/or protection regions on the basis of variable geometry elements. In one exemplary embodiment, the geometry elements are produced graphically in or above a real image of the spatial region to be monitored. The real image can include a number of reference marks that are used to define a configuration plane. The variable geometry element is then produced relative to the configuration plane in order to provide an unambiguous relationship between the "virtual" geometry element and the real spatial region. Incorrect assignments of parallel edges and measurement errors ensuing therefrom cannot, however, be avoided with the known method.

SUMMARY OF THE INVENTION

Against this background, it is an object of the present invention to provide a method and a device that enable reliable monitoring of a spatial region even when structures having relatively closely spaced substantially parallel edges are present in the spatial region. It is another object to provide a method and a device that enable reliable safeguarding of a hazardous region of a machine operating in automated fashion if structures having substantially parallel edges are present in the vicinity of the machine. It is yet another object to provide a method and device that allow to monitor a region including structures having substantially parallel edges in a simple and cost-effective manner.

In accordance with a first aspect of the invention, there is provided a method for monitoring a spatial region comprising a number of movable objects, the method comprising the steps of providing a first and a second image recording unit, which are arranged at a defined distance from one another; recording a first image of the spatial region by means of the first image recording unit and recording a second image of the spatial region by means of the second image recording unit; determining a number of object positions on the basis of the first and second images, wherein each object position represents a spatial distance of an object relative to the image recording units; and generating a switching signal depending on the object positions; wherein the spatial region comprises a structure having a plurality of relatively closely spaced substantially parallel edges; wherein a number of defined reference marks is arranged at the structure; wherein a number of reference distances between the image recording units and the reference marks is determined; and wherein a structure position of the structure is determined on the basis of the reference distances.

According to another aspect of the invention, there is provided a device for monitoring a spatial region comprising a number of movable objects and comprising a stationary structure having a plurality of relatively closely spaced substantially parallel edges, the device comprising a first image recording unit for recording a first image of the spatial region; a second image recording unit for recording a second image of the spatial region, the first and second image recording units being arranged at a defined distance from one another; and an evaluation and control unit designed to determine a number of object positions on the basis of the first and second images and to generate a switching signal depending on the object positions; wherein each object position represents a spatial distance of one of the number of objects relative to the image recording units; wherein a number of reference marks are arranged at the stationary structure; and wherein the evaluation and control unit is further designed to determine a number of defined reference distances between the image recording units and the reference marks, and to determine a structure position of the stationary structure on the basis of the reference distances.

According to yet another aspect, there is provided a computer readable storage medium designed for interfacing with a computer that is connected to a first and a second image recording unit which are arranged at a defined distance from one another, the computer readable storage medium comprising an interface for communicating with the computer and comprising program code configured to execute a method comprising the steps of recording a first image of a spatial region by means of the first image recording unit and recording a second image of the spatial region by means of the second image recording unit; determining a number of object positions using the first and second images, wherein each object position represents a distance between a moveable object located in the spatial region and the image recording units; and generating a switching signal depending on the object positions; wherein the spatial region also comprises a stationary structure having a plurality of relatively closely spaced substantially parallel edges; wherein a number of defined reference marks is arranged at the structure; wherein a number of reference distances between the image recording units and the reference marks is determined; and wherein a structure position of the structure is determined on the basis of the reference distances.

The novel method and the novel device are advantageously implemented by means of such a computer program.

The novel method and the novel device use defined reference marks in order to selectively mark the problematic edge structure. The reference marks are arranged and preferably fixed at the structure having a plurality of relatively closely spaced substantially parallel edges. The reference marks have a visible surface having light and/or dark regions, which differs from the structure and the immediate vicinity thereof, such that the reference marks can be unambiguously identified and assigned to one another in the recorded images. In preferred exemplary embodiments, the reference marks are adhesive films that are adhesively bonded to the circumference and/or to corners of the structure having the parallel edges. Generally, it is advantageous if the reference marks are very flat perpendicular to their visible surface, i.e. are embodied in paper- or film-like fashion, such that the reference distances between the reference marks and the image recording units have no or at most a very small difference with respect to the corresponding distances of the structure in the region of reference marks. Consequently, the reference marks are artificially generated target points within the recorded images which are used to mark the structure in order to facilitate the distance measurement with regard to the structure. By means of the reference marks, the position of the problematic structure can be determined relatively simply and reliably in an "indirect" manner. This includes, in particular, determining the distance of the structure relative to the image recording units. The reference distances are at least temporarily used as distance measurement values for the structure.

The novel method and the novel device can be realized cost-effectively in a relatively simple manner. Moreover, they enable high identification reliability and make it possible to avoid or at least reduce incorrect assignments in the images simultaneously recorded. Therefore, the novel method and the novel device are suitable, in particular, for use for safeguarding hazardous regions.

In a preferred refinement, at least three reference marks defining a virtual reference area are arranged at the structure, wherein the virtual reference area substantially overlays the plurality of parallel edges. Accordingly, the evaluation and control unit of the novel device is designed to determine a virtual reference area on the basis of at least three reference marks which are arranged at the structure and define a plane.

This refinement has the advantage that that the majority or even all of the problematic edges of the structure can be marked, without fundamentally altering or concealing the structure. The virtual reference area, which is "invisible" in the images, can be determined simply and with high accuracy by means of at least three, preferably at least four, reference marks. Furthermore, the position (including the distance with respect to the image recording units) of the virtual reference area can also be determined simply and with high accuracy on the basis of the images recorded in parallel. Consequently, the reference area marks the problematic edge region, such that this region can be subjected to a separate evaluation in a targeted manner. In this way, the detection dependability and reliability of the novel device and of the novel method can be improved in a very efficient manner.

In a further refinement, for at least one of the parallel edges, an edge distance relative to the image recording units is determined on the basis of the first and second images, and also on the basis of the virtual reference area. Preferably, an edge distance is determined for a plurality and particularly preferably for all of the edges of the structure.

This refinement yields accurate distance information for the problematic edges by virtue of the fact that, in addition to the image information and the known distance between the image recording units, the newly obtained information representing position and distance of the reference area is evaluated. On the other hand, the distance information is attributed to the actual image contents i.e. the parallel edges visible in the images. With this refinement it is possible to obtain unambiguous and accurate distance information for all problematic edges. The further evaluation of the images, in particular the monitoring of protection areas, is simplified by this refinement because problematic edge regions can be processed like "normal" or unproblematic image regions on the basis of the unambiguously determined distance.

In a further refinement, for the at least one edge, an edge position within the first and/or second image is determined and permanently stored.

In this refinement, the position of the at least one edge in the two-dimensional images is determined and permanently stored. "Permanently stored" means that the edge position is provided in a memory of the novel device at least for the entire duration of uninterrupted operation. Preferably, the edge position is stored in a nonvolatile memory of the device, such that the edge position can be read out even after an interruption of the power supply. The refinement has the advantage that the problematic edge region can be identified in each case very simply and rapidly in the recorded images during a monitoring mode of operation in which first and second images are repeatedly recorded. The evaluation of a new image pair in a cyclic monitoring mode of operation is simplified, such that this refinement contributes to real-time operation that can be realized in a cost-effective manner.

In a further refinement, the edge distance for the at least one edge is also permanently stored.

This refinement further contributes to enabling a monitoring mode of operation in real time, with the problematic edge structure being taken into account in a simple and cost-effective manner. The unambiguously determined and stored edge distance can advantageously be used in the evaluation of each new image pair for the verification of a currently obtained measurement value and/or instead of a current measurement value.

In a further refinement, the first and second images are repeatedly recorded, and the object positions are repeatedly determined, wherein the structure position is determined on the basis of the stored edge distance. It is particularly advantageous if the stored edge distance, which, in particular, was determined in a separate refinement mode, is permanently stored and used for each new image pair as the current edge distance.

In this refinement, the edge distance determined once replaces subsequent "measurement values" of the edge distance in the repeatedly recorded images. In other words, the distance of the edges, despite the repeated image recordings, is determined only once and then permanently used. This refinement is advantageously employed only in the case of structures which are spatially stationary or not moved. By contrast, current distances are determined for all other objects in the spatial region, including for areas that do not have parallel edges. The refinement has the advantage that correct "measurement values" are made available for the problematic edge region in a very efficient manner. False alarms and resulting machine stops are avoided in a simple manner during the monitoring of a dangerous machine. On the other hand, this refinement contributes to high detection reliability, since objects in the foreground of the structure must always have a smaller distance with respect to the image recording units and, consequently, can be verified very easily on the basis of the different distances.

In a further refinement, at least one of the reference marks remains permanently attached at the structure. It is particularly preferred if the stored edge distance is accepted on the basis of the permanently arranged reference mark; in particular, it is only accepted if the at least one reference mark is detected at its originally determined position and/or with its originally determined reference distance.

This refinement provides even higher failsafety when safeguarding a machine, since a stored edge distance is used as a "current measurement value" only when, on the basis of the at least one reference mark that has remained, it has been ascertained that the structure has not changed its distance and position relative to the image recording units.

In a further refinement, the object position of a movable object is verified on the basis of the structure position of the structure. It is advantageous if the stored edge distance in this case represents the structure position of the structure, such that the object position of a movable object is verified on the basis of the at least one edge distance.

In this refinement, a plausibility check takes place, which is used to check whether the measured object position of a detected movable object lies within the available spatial region. If the edge structure is e.g. a lattice or a striped pattern at the floor of the spatial region, the object distance to a movable object has to be less than the edge distance. In other words, the movable object is situated in the foreground, while the structure having the parallel edges constitutes a background. Such a plausibility check contributes to even higher failsafety when monitoring a spatial region, and it contributes to a lower false alarm rate.

In a further refinement, the structure is spatially stationary. This refinement makes it possible to implement the novel method very simply and efficiently, in particular if the edge distances determined once are intended to be used instead of current measurement values in the course of a monitoring operation. On the other hand, this refinement fits to an application that occurs very often in practice because structures having parallel edges are often the result of barriers, background markings and/or other structural measures. The refinement enables, in a very efficient manner, a high detection reliability when monitoring a spatial region in which parallel edges make it difficult to achieve unambiguous assignment in the images recorded in parallel.

It goes without saying that the features mentioned above and those yet to be explained below can be used not only in the combination respectively specified, but also in other combinations or by themselves, without departing from the scope of the present invention.

BRIEF DESCRIPTION OF THE DRAWINGS

Exemplary embodiments of the invention are illustrated in the drawing and are explained in greater detail in the description below. In the Figures:

FIG. 3 shows a simplified illustration of a first image of a monitored spatial region, FIG. 4 shows a simplified illustration of a second image of the spatial region.

DESCRIPTION OF PREFERRED EMBODIMENTS

Figure 1:
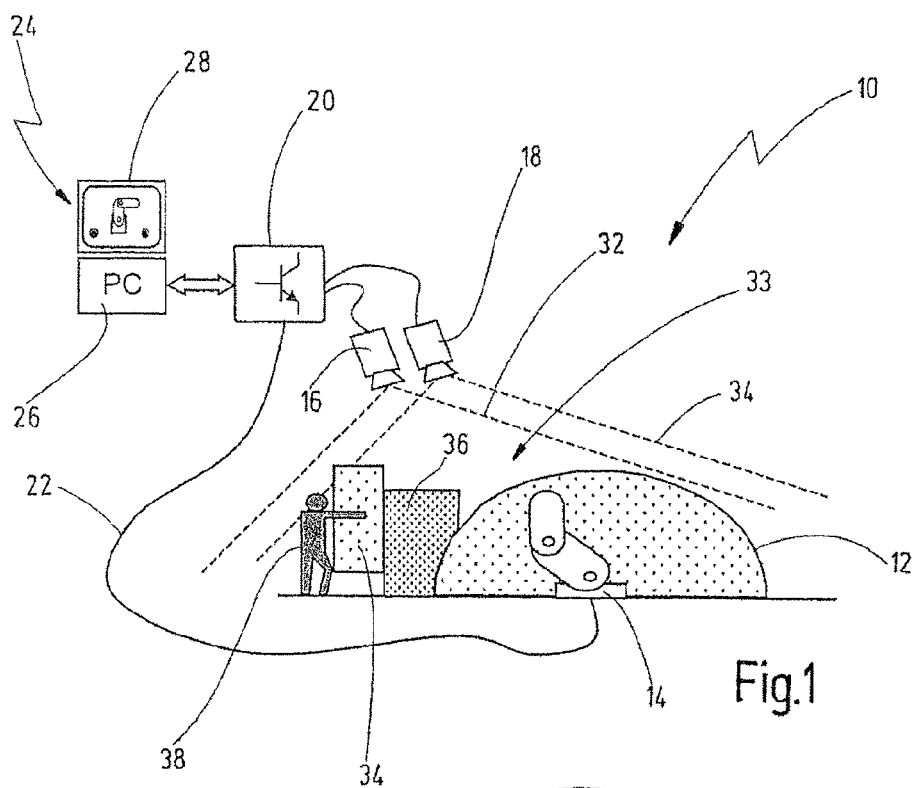
FIG. 1 shows a schematic illustration of an exemplary embodiment of the novel device.

In FIG. 1, an exemplary embodiment of the novel device is designated by the reference numeral 10 in its entirety. The device 10 serves here for safeguarding the working region 12 of a robot 14. The robot 14 is a machine which operates in automated fashion and which, on account of its movements, constitutes a hazard for persons who enter the working region 12. Even though it is a preferred exemplary embodiment, the novel device and the novel method are not restricted to safeguarding machines. They can also be used for monitoring spatial regions for other reasons, for instance for monitoring a strongroom.

Figure 2:
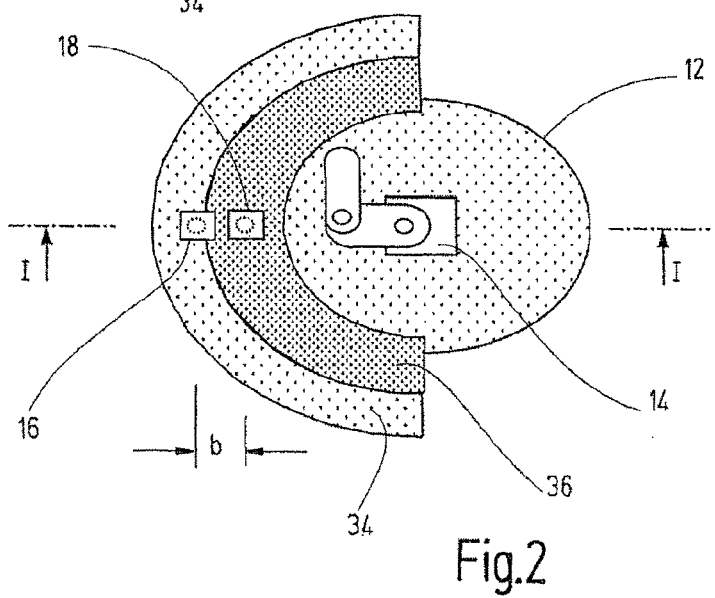
FIG. 2 shows the device of FIG. 1 (in parts) in a plan view.

The device 10 has two image recording units 16, 18, which are arranged at a defined and known distance b from one another (see FIG. 2). In the preferred exemplary embodiments, the device 10 has a third image recording unit (not illustrated here), wherein two image recording units in each case are arranged at the defined and known distance b from one another and wherein the three image recording units are arranged in an L-shaped manner with respect to one another. In this case, the three image recording units form two pairs of image recording units, wherein only one pair comprising the image recording units 16, 18 is described hereinafter for the sake of simplicity. An L-shaped arrangement of at least three image recording units ensures that edges having arbitrary directions of progression can be identified by at least one of the pairs and evaluated.

The device 10 further has an evaluation and control unit 20, which is connected to the image recording units 16, 18. The evaluation and control unit 20 controls the image recording by the image recording units 16, 18 and evaluates the recorded images, in order to drive the robot 14 in a manner dependent on the images.

In principle, the evaluation and control unit 20 can be part of an operating controller of the robot 14. In some exemplary embodiments, the evaluation and control unit 20 is a separate safety controller that serves for safeguarding the hazardous working region 12. The operating controller (not illustrated here) of the robot 14 is then realized separately. The evaluation and control unit 20 is able to generate a switching signal in a manner dependent on the images of the image recording units 16, 18, by means of which switching signal the robot 14 can be switched off completely or into operation at reduced speed. Reference numeral 22 represents a cable via which the evaluation and control unit 20 transmits the switching signal to the robot 14. The switching signal can include a switch-off signal, a control signal, an enable signal and/or a warning signal.

Reference numeral 24 designates a configuration device for configuring the device 10. In the preferred exemplary embodiments, the configuration device 24 includes a PC 26 and a display 28. The display 28 is designed, inter alia, for displaying images recorded by the image recording units 16, 18. However, the display of these images is primarily used for configuring and/or checking the device 10. In the normal working mode of operation, the device 10 preferably operates fully automatically, i.e. the evaluation and the control unit 20 generates the switching signal 22 in a manner dependent on the images of the image recording units 16, 18, without the images having to be displayed on the display 28. The PC 26 and the evaluation and control unit 20 are connected via a bidirectional data link for the transmission of data and images, said data link being indicated by a double-headed arrow in FIG. 1.

Reference numerals 32, 34 represent the recording regions of the image recording units 16, 18. As can be readily seen, the recording regions 32, 34 are somewhat offset with respect to one another. However, there is a common or overlapping recording region 33, which defines the spatial region to be monitored and in which the working region 12 lies here. Only within the common recording region 33 is the evaluation and control unit 20 able to determine distances between the image recording units 16, 18 and objects in the manner described below.

Reference numeral 34 designates a warning zone and reference numeral 36 designates a switch-off zone. The warning zone 34 and the switch-off zone 36 are monitoring regions extending at least partly around the working region 12 of the robot 14. The monitoring regions 34, 36 are virtual protective fences that can be defined by means of the configuration device 24. If a moving object, such as a person 38, enters the warning zone 34 and/or the switch-off zone 36, this is identified by means of the device 10 and the evaluation and control unit 20 generates the switching signal 22 for the robot 14. If the person 38 enters the warning zone 34, the evaluation and control unit 20 may generate e.g. a switching signal which has the effect that the robot 14 operates at a reduced speed. Moreover, an acoustic and/or visual warning signal may be generated. If the person 38 enters the switch-off zone 36 despite these measures, the evaluation and control unit 20 may generate a further switching signal, which shuts down the robot 14.

In order to detect the intrusion of a person 38 or some other movable object into one of the zones 34, 36, the evaluation and control unit 20 determines a three-dimensional image of the entire recording region 33 in a manner dependent on the images of the image recording units 16, 18. The three-dimensional image includes distance information representing a distance between the image recording units 16, 18 and individual objects and structures within the common recording region 33. The warning and switch-off zones 34, 36 are defined on the basis of coordinates within the three-dimensional image, such that the entry of a person 38 into one of the zones can be detected solely on the basis of the image data from the image recording units 16, 18. An advantageous method for configuring the warning and switch-off zones 34, 36 is described in DE 10 2005 063 217 A1 cited in the introduction, the disclosure of which is here incorporated by reference in its entirety.

A preferred method for determining the distance information is briefly explained below with reference to FIGS. 3 and 4. FIG. 3 shows, by way of example and in a simplified manner, a first image 40 of the monitored spatial region, which was recorded by the first image recording unit 16. The image 40 shows here by way of example a machine 42 and a switchgear cabinet 44. In addition, a structure 46 having a plurality of relatively closely spaced substantially parallel edges 48 is illustrated in front of the machine 42. The structure 46 could be e.g. a striped pattern comprising light and dark stripes which is arranged on the floor in front of the machine 42. Furthermore, the structure 46 could be a lattice arranged in front of the machine 42 e.g. with run-off channels for liquids. Further examples of structures 46 having parallel or substantially parallel edges may be lattice fences or staircase-like three-dimensional structures.

FIG. 4 shows a second image 50, which was recorded by the second image recording unit 18. The second image 50 shows the same spatial region as the first image 40. In all of the preferred exemplary embodiments, the first and second images are recorded synchronously and substantially simultaneously with respect to one another. In principle, however it is also conceivable for the images 40, 50 to be recorded in a temporally offset manner, provided that the temporal offset between the two image recordings is small enough that only a small change in the position of movable objects can occur in the common recording region 33.

As is illustrated with reference to FIGS. 3 and 4, the first image 40 and the second image 50 share the same scene. However, the objects and structures 42, 44, 46 in the two images 40, 50 appear offset with respect to one another, as is illustrated by reference numeral 52. The offset d is a consequence of the offset recording regions 30, 32 of the two image recording units 16, 18.

Preferably, the two image recording units 16, 18 have parallel optical axes and the two image recording units 16, 18 are at least substantially identical. For this case, the following relationship holds true:

$$r = b \cdot f / d$$

where f is the focal length of the image recording units, b is the distance (the so-called base width) between the two image recording units 16, 18, r is the distance between an object or a structure edge and the common reference point of the image recording units 16, 18, and d is the so-called disparity, i.e. the offset 52 in the two images. Given a known base width b and a known focal length f, the respective distance r of an object or structure edge with respect to the image recording units can be determined on the basis of the measured disparities.

A prerequisite for determining the distance r, however, is that the mutually corresponding structure or object edges in the two images 40, 50 can be unambiguously identified and assigned to one another, in order to determine the respective disparity d. In the case of structures 46 having a plurality of relatively closely spaced parallel edges 48a, 48b, the assignment of mutually corresponding edges is difficult and susceptible to errors, particularly if a large number of parallel edges having the same appearance exist. An incorrect edge assignment leads to incorrect distance information.

Figure 5:
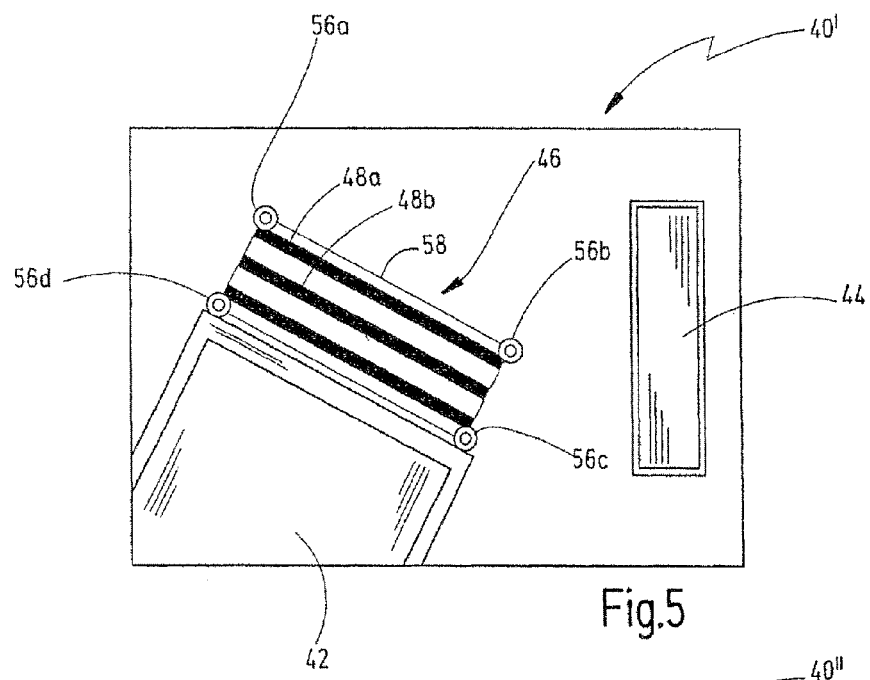
FIG. 5 shows a further image of the spatial region, wherein reference marks defined here are arranged at a structure having parallel edges.

FIG. 5 shows a first image 40', in which four reference marks 56a, 56b, 56c, 56d were arranged at the corners of the structure 46. In preferred exemplary embodiments, the reference marks 56 are punctiform or circular film pieces which have a defined light-dark pattern. Furthermore, it is advantageous if the reference marks are fixed, e.g. adhesively bonded, to the structure 46.

As is illustrated in FIG. 5, each reference mark 56 forms a defined target point within the images, wherein only the first image 40' is illustrated here for the sake of simplicity. The reference marks 56 can easily be identified and assigned to one another in the recorded images on the basis of their known and/or high-contrast features. On the basis of the respective disparity it is possible to determine the distance r between the image recording units 16, 18 and the individual reference marks 56a, 56b, 56c, 56d.

As can further be discerned in FIG. 5, the reference marks 56a, 56b, 56c, 56d define a virtual reference area 58, which overlays the structure 46 congruently here. Since the distances of the individual reference marks 56a, 56b, 56c, 56d can be determined accurately, the position and distance of the virtual reference area 58 can also be determined accurately on the basis of the recorded images. In the preferred exemplary embodiments, the disparities and distances of the individual parallel edges 48a, 48b are determined based on these data and are assigned to the respective edges 48a, 48b. For determining the disparities of the parallel edges 48a, 48b, it is advantageous that the disparities of the edges change proportionally within the (now known) reference area. By means of this additional information, for each edge 48a, 48b in the first image 40', the respectively corresponding edge in the second image can be unambiguously assigned. In this way, the disparities and distances of all the edges 48a, 48b can be determined unambiguously and in a manner free of errors.

Figure 6:
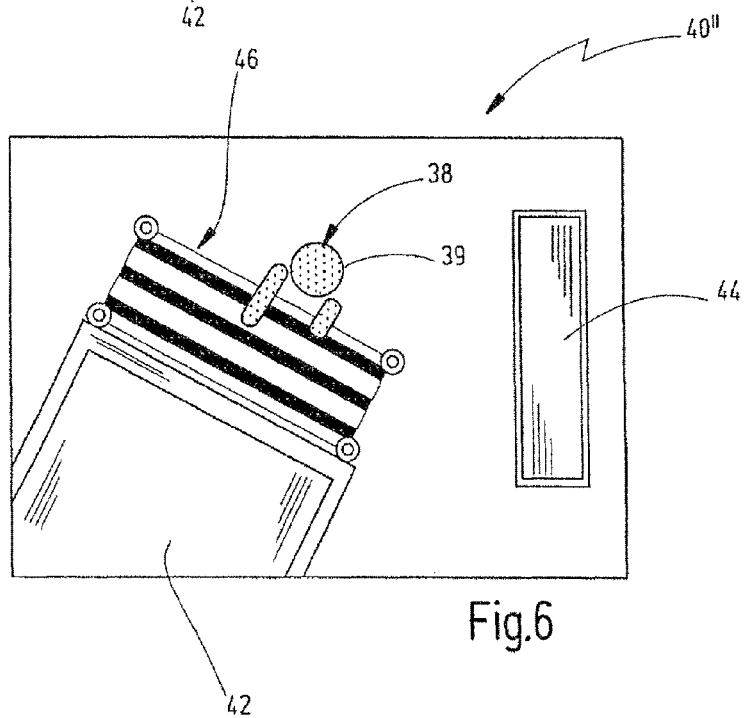
FIG. 6 shows a further image of the spatial region with a person.

FIG. 6 shows a further image 40" of the first image recording unit 16, wherein now the person 38 is approaching the machine 42. The person 38 has to be situated in front of the structure 46, which forms a background. In order to be able to determine the distance of the person 38, it is necessary to detect contour edges 39 of the person in the parallel images and to assign them to one another in order to determine the disparities. Should it emerge on the basis of the disparities with respect to the contour edges 39 that the person 38 is further away than the edge contour 46, an incorrect edge assignment with regard to the contour edge 39 is evidently present. Preferably, the edge assignment with regard to the contour edge 39 is then corrected and the disparities are determined with the corrected edge assignments. If the distance with respect to the person is now less than that with respect to the structure 46, the corrected measurement is accepted as a valid measurement. It is only if no edge assignment is possible which produces a valid measurement that the robot is switched off. Otherwise, the distance accepted as plausible is used for the further evaluation. Consequently, it is possible to determine the distance with respect to the contour edge 39 and thus the three-dimensional position of the person 38 within the monitored spatial region despite the parallel edges in an efficient and reliable manner.

Figure 7:
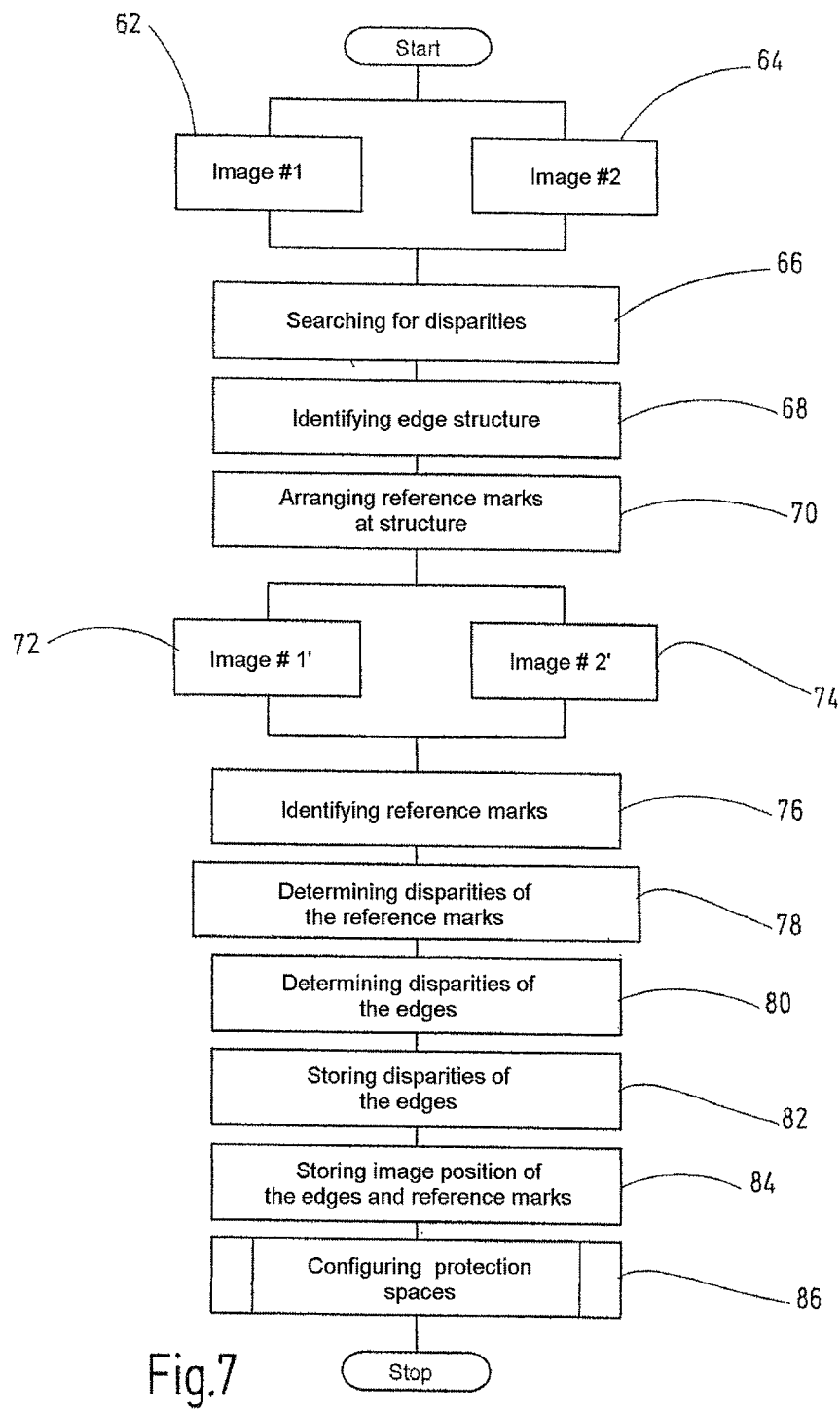
FIG. 7 shows a flow chart for illustrating an exemplary embodiment of the novel method.
Figure 8:
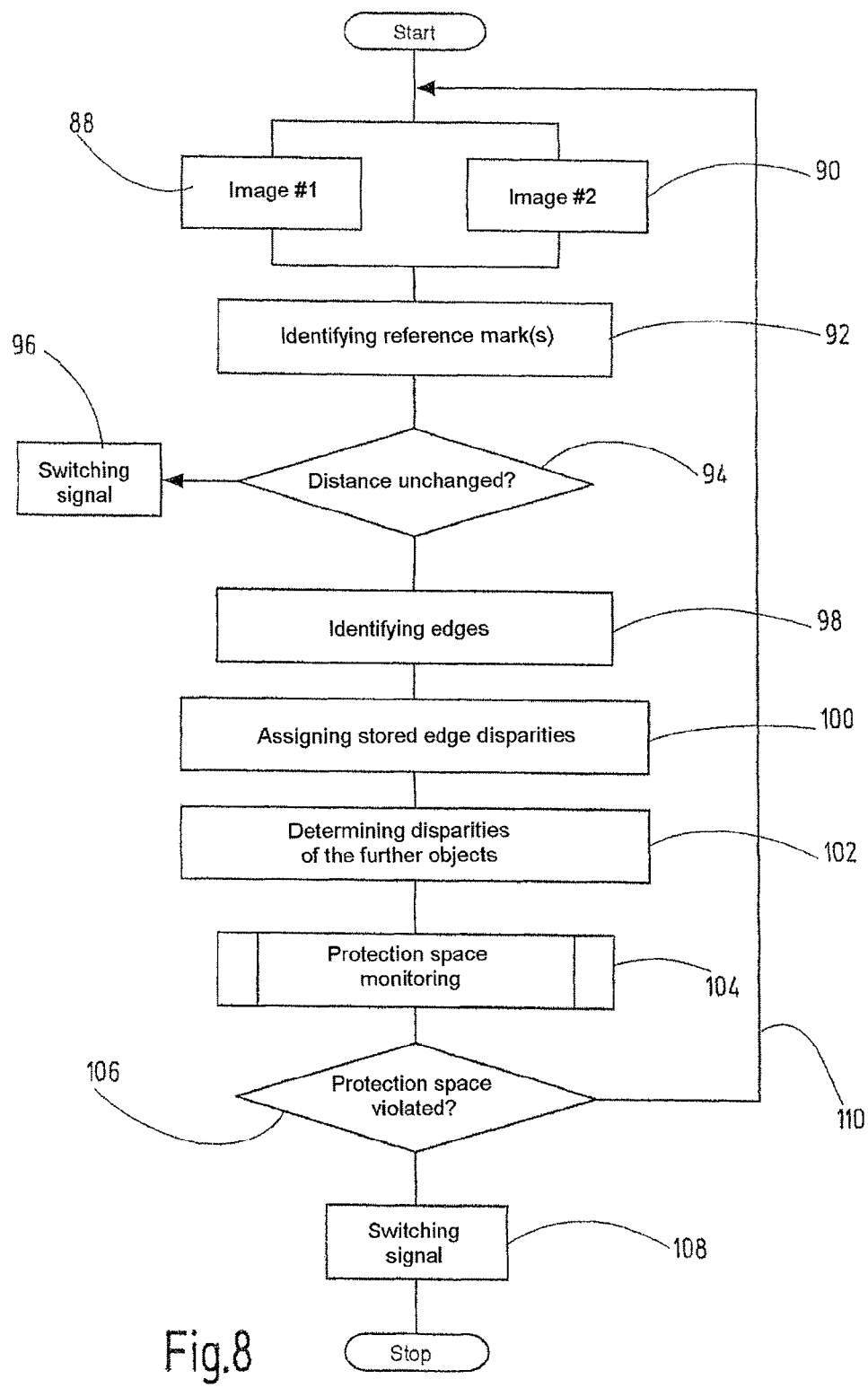
FIG. 8 shows a further flow chart for illustrating an exemplary embodiment of the novel method.

FIGS. 7 and 8 show a preferred exemplary embodiment of the novel method on the basis of two flow charts. FIG. 7 shows a configuration mode by means of which the device 10 is configured before the actual monitoring mode of operation begins. In steps 62 and 64, the images 40, 50 are recorded—preferably synchronously—by means of the image recording units 16, 18. Step 66 involves searching for the disparities with respect to the various object edges and structure edges in the images. This search includes identifying and assigning mutually corresponding object edges and structure edges. Afterward, step 68 involves identifying structures for which the disparities can be determined only with difficulty or cannot be determined at all, owing to lack of assignment. In the examples with FIGS. 3 to 6, this applies to the structure 46.

In accordance with step 70, reference marks 56 are arranged at the identified structure. In accordance with steps 72 and 74, a further pair of images is recorded by means of the image recording units 16, 18. Afterward, step 76 involves identifying the reference marks in the further images. Step 78 involves determining the disparities of the reference marks. The virtual reference area 58 is determined by means of the disparities of the reference marks. Afterward, step 80 involves determining the disparities of the individual edges 48a, 48b of the structure 46, wherein the now known position of the reference area 58 and the known disparities of the reference marks 56 are used in order to obtain an unambiguous assignment of the respectively corresponding edges 48a, 48b in the two images. Step 82 involves permanently storing the disparities of the individual edges 48a, 48b. Moreover, step 84 involves storing the image positions of the individual edges 48a, 48b and also the positions of the reference marks 56. In this case, "image position" designates the position of the edges and reference marks within the two-dimensional images of the image recording units 16, 18. Afterward, in accordance with step 86, it is possible to configure individual protection spaces such as, for instance, the warning zone 34 or the switch-off zone 36. The protection spaces are preferably configured according to the method described in DE 10 2005 063 217 A1 cited in the introduction. The device 10 can then be brought to the monitoring mode, which is illustrated with reference to FIG. 8.

In accordance with steps 88 and 90 in FIG. 8, in the monitoring mode of operation, too, a pair of images is recorded by means of the image recording units 16, 18. Afterward, the reference marks 56 are identified in the recorded images in accordance with step 92. Moreover, the distances and positions of the reference marks 56 are determined on the basis of the disparities.

Step 94 involves checking whether the distances and/or positions of the reference marks 56 are unchanged relative to the stored distance and position information for the reference marks. If this is not the case, step 96 involves generating a switching signal which, in the preferred exemplary embodiments, includes a switch-off signal for switching off the robot or the monitored machine. As an alternative thereto, the switching signal can trigger a new disparity determination in the region of the reference marks and/or of the edge structure, with the machine being switched off only if no plausible distance values arise in the new disparity determination.

If the position of the reference marks is unchanged in comparison with the data obtained in the configuration mode, the monitoring mode of operation is continued. Step 98 involves identifying the parallel edges of the structure 46 on the basis of the stored image positions. In accordance with step 100, the stored edge disparities are assigned to the identified edges 48a, 48b. In other words, the preferred exemplary embodiment of the novel method dispenses with a procedure in which the disparities and distances of the parallel edges 48a, 48b are repeatedly determined in each case during the monitoring mode of operation. Rather, the edge disparities determined and stored in the configuration mode replace current measurement values.

Afterward, step 102 involves determining the disparities for all further object edges. Step 104 then involves monitoring the protection space, i.e. evaluating whether a person or some other object has entered one of the defined protection spaces 34, 36. If an intrusion into a protection space is detected in accordance with step 106, step 108 involves generating a signal which can once again include a switch-off signal for switching off the monitored machine. If no intrusion into a protection space is detected, the method returns to image recording in steps 88, 90 in accordance with loop 110. In the monitoring mode, the method in accordance with FIG. 8 is cyclically repeated therefore.

Overall, the novel method and the novel device serve for preventing an incorrect assignment of parallel edges in stereoscopically recorded images, by using defined reference marks, such as artificial ring patterns for instance, in order to carry out correct disparity and distance determination for the parallel edges. The disparities and/or distances for the parallel edges are advantageously stored permanently in a memory of the evaluation and control unit and assigned to the problematic edges in the subsequent monitoring mode of operation. Preferably, for this purpose, the position of the parallel edges in the two-dimensional images is determined and stored together with the disparity and/or distance information. Incorrect assignments of edges can be reduced to a minimum by means of this method. Advantageously, at least three reference marks are used in the configuration mode in order to determine the disparities/distances with respect to the parallel edges. Furthermore, it is preferred that at least one of the reference marks remains permanently at the problematic structure in order to ensure, by means of said reference mark, that the disparities/distances determined in the configuration mode are also valid in the monitoring mode of operation. It is therefore advantageous if the problematic structures having parallel edges are stationary and delimit the monitored spatial region, since the parallel edges in this case form a background against which movable objects move in the monitoring mode of operation. The respective distance of the moving objects must therefore be smaller than the distances to the parallel edges in the background, which enables a simple plausibility check. By means of the novel method, it is possible to significantly reduce computational complexity when determining disparities and distances at parallel edges. Moreover, incorrect assignments and measurement errors ensuing therefrom can be avoided.

What is claimed is:

1. A method for monitoring a spatial region comprising a number of movable objects and a structure having a plurality of relatively closely spaced substantially parallel edges, the method comprising the steps of:
    providing a first and a second image recording unit, which are arranged at a defined distance from one another,
    recording a first image of the spatial region by means of the first image recording unit and recording a second image of the spatial region by means of the second image recording unit,
    determining a number of object positions on the basis of the first and second images, wherein each object position represents a spatial distance of an object relative to each of the first and second image recording units,
    determining a position of said structure on the basis of the first and second images, wherein the position of said structure is defined by a spatial distance of said structure relative to each of the image recording units, and
    generating a switching signal depending on the object positions,
    wherein a number of defined reference marks are placed in the spatial region proximate to said structure,
    wherein a number of reference distances between the first and second image recording units and the reference marks is determined, and
    wherein the spatial distance of said structure relative to each of said image recording units is determined on the basis of the reference distances.

2. The method of claim 1, wherein at least three reference marks are arranged at the structure, said at least three reference marks defining a reference area substantially overlaying the plurality of parallel edges.

3. The method of claim 2, wherein an edge distance relative to the first and second image recording units is determined for at least one of the parallel edges using the first and second images and using the reference area.

4. The method of claim 3, wherein the edge distance for the at least one edge is permanently stored into a memory.

5. The method of claim 4, wherein the first and second images are repeatedly recorded and the object positions are repeatedly determined thereby defining a plurality of operation cycles, with the structure position being repeatedly determined on the basis of the stored edge distance in each operation cycle.

6. The method of claim 1, wherein an edge position for the at least one of the parallel edges is determined, and said edge position is permanently stored into a memory.

7. The method claim 1, wherein at least one of the reference marks is permanently arranged at the structure.

8. The method of claim 1, wherein an object position of at least one of the movable objects is verified using the structure position.

9. The method of claim 1, wherein the structure is stationary within the spatial region.

10. A device for monitoring a spatial region comprising a number of movable objects and comprising a stationary structure having a plurality of relatively closely spaced substantially parallel edges, the device comprising:
    a first image recording unit for recording a first image of the spatial region,
    a second image recording unit for recording a second image of the spatial region, the first and second image recording units being arranged at a defined distance from one another, and
    an evaluation and control unit designed to determine a number of object positions on the basis of the first and second images and to generate a switching signal depending on the object positions,
    wherein each object position represents a spatial distance of one of the number of objects relative to the first and second image recording units,
    wherein a number of reference marks are placed in the spatial region proximate to said stationary structure, and
    wherein the evaluation and control unit is further designed to determine a number of defined reference distances between the first and second image recording units and the reference marks, and to determine a position of said stationary structure on the basis of the reference distances.

11. The device of claim 10, wherein at least three reference marks defining a reference area are arranged at the stationary structure, with the reference area substantially overlaying the plurality of parallel edges.

12. The device of claim 11, wherein the evaluation and control unit is further designed to determine an edge distance relative to the first and second image recording units for at least one of the parallel edges using the first and second images and using the reference area.

13. The device of claim 12, further comprising a memory for permanently storing the edge distance.

14. The device of claim 11, wherein the evaluation and control unit is further designed to determine an edge position within at least one of the first and second images for at least one of the plurality of edges.

15. The device of claim 14, further comprising a memory for permanently storing the edge position.

16. The device of claim 10, wherein at least one of the reference marks is permanently arranged at the stationary structure.

17. The device of claim 10, wherein the evaluation and control unit is further designed to verify an object position of one of the number of movable objects using at least one of the reference distances and the position of the structure.

18. A non-transitory computer readable storage medium designed for interfacing with a computer that is connected to a first and a second image recording unit which are arranged at a defined distance from one another, the computer readable storage medium comprising an interface for communicating with the computer and comprising program code configured to execute a method comprising the steps of:

recording a first image of a spatial region by means of the first image recording unit and recording a second image of the spatial region by means of the second image recording unit, determining a number of object positions using the first and second images, wherein each object position represents a distance between a moveable object located in the spatial region and the first and second image recording units, and generating a switching signal depending on the object positions, wherein the spatial region also comprises a stationary structure having a plurality of relatively closely spaced substantially parallel edges, wherein a number of defined reference marks are placed in the spatial region proximate to said stationary structure, wherein a number of reference distances between the first and second image recording units and the reference marks is determined, and wherein a position of said stationary structure is determined on the basis of the reference distances.

\* \* \* \* \*